Patented Dec. 28, 1948

2,457,357

UNITED STATES PATENT OFFICE 2,457,357

NOVEL ADHESIVE PRODUCT AND PROCESS
OF MAKING SAME

James E. Fenn, Baldwin, N. Y.

No Drawing. Application June 14, 1947,
Serial No. 754,765

9 Claims. (Cl. 260—17.5)

The present invention relates to a novel type of adhesive material, and to the process of making the same.

A general object of the present invention is to provide a novel type of adhesive material which is relatively inexpensive and which can be used for almost any purpose for which animal glues are used.

A more specific object is to provide an inexpensive, highly tacky, re-moistening adhesive material which can be used in the manufacture of gummed tape.

Another object of the invention is to enable the economical manufacture of a novel adhesive which has innumerable uses in the liquid-adhesive industry by a process which employs readily available raw materials whose cost is less than any other raw materials presently used in this industry for the manufacture of adhesives.

A further object is to provide a relatively highly tacky re-moistening adhesive by using the concentrated waste liquor of the sulfite pulp process.

It is known that wood, essentially, consists of cellulose and lignin. In the manufacture of wood pulp for paper making, it is desired to obtain the cellulose in as pure form as possible, and this requires a process for separating the cellulose from the lignin. When wood and similar lignified materials are heated with a solution of sulfurous acid and acid sulfites, the lignin goes into solution leaving the cellulose and cellulosans. This process has grown to the point where in 1946 over 4 million tons of sulfite pulp were produced in the United States alone for the manufacture of paper. Essentially, the sulfite process involves the digestion of wood, in the form of chips, at temperatures of 130 to 150° C. in an aqueous solution containing alkaline-earth bisulfites (usually calcium bisulfite or a mixture of calcium and magnesium bisulfites) and an excess of sulfur dioxide. During digestion lignin combines with sulfur dioxide or the sulfurous acid ion $HSO_3^-$, and is rendered soluble, or peptized in solution. The less resistant hemicelluloses are hydrolized to simpler compounds and a portion of the wood cellulose is degraded. Extraneous components of the wood also react to a greater or lesser extent with the cooking liquor. The object of the sulfite process is to produce the maximum yield of pure cellulose or wood-pulp, with substantially complete removal of the polyuronide hemicelluloses and lignin. These are formed during the digestion and go into solution.

It has long been known that the fundamental reaction of sulfite pulping is sulfonation of lignin, and that the lignin derivative in the waste liquor is in the form of a calcium and magnesium salt of lignosulfonic acid. A number of investigators have tried to determine the exact composition of this waste liquor and the literature concerning the structure of lignin is rather extensive. However, Louis E. Wise of the Institute of Paper Chemistry, Appleton, Wisconsin, in his book: Wood Chemistry, published by Reinhold Publishing Corp. in 1944, under the auspices of the American Chemical Society, states the following: "It cannot be emphasized too strongly that it is entirely premature to propose any constitutional formula for lignin considering our incomplete knowledge of the chemistry of this substance."

As lignin constitutes about 40–50% of the wood used for the manufacture of pulp, the disposition of the waste liquor from the sulfite process has been a major problem of the pulp industry. This waste liquor, which is a by-product of the sulfite pulp process, is a disagreeably smelling, dark liquid which would create a serious health-hazard if permitted to be emptied into streams and rivers. It is for this reason that laws have been promulgated preventing the disposal of this waste liquor into rivers. It has been the custom of the pulp manufacturers to evaporate down and burn this by-product. For many years experiments have been conducted to determine if this waste material could be used for industrial purposes. Some pulp-mills dry this waste liquor and sell the dry product for road-binding, core-forming, the making of cheap plastics, etc. Some pulp-mills evaporate down this liquor to about 50–60% solids and sell it in liquid form where small quantities of it are used for the above-mentioned purpose. This concentrated waste-liquor of the sulfite process of the pulp-manufacture having 50–60% solids is sold under the trade-name of Lignone and is a dark greenish-brown liquid which is fairly thin. Since Lignone is a derivative of lignin, its chemical composition is also unknown.

In accordance with the present invention, the Lignone (which is herein referred to as the concentrated waste liquor of the sulfite process of pulp manufacture) is treated with a small amount of phosphoric acid under carefully controlled conditions. The product obtained as a result of the process of the invention comprises a light brown, uniform, heavy-bodied material similar to honey or corn syrup which has good tack and adhesive qualities. When the material of the invention is spread on a sheet of paper it leaves a light brown, shiny film which dries and has excellent adhesive qualities on re-moistening.

A characteristic of the adhesive material of this inventon is that when used on paper or corrugated board it develops a strong initial bond which weakens to a small extent on drying. This is an important advantage when used as a palletizing adhesive for holding together loaded cartons for easy storing and loading. The slight weakening action of the adhesive of the invention on drying, enables the loaded cartons to be easily separated by suddenly applying a jarring force to a carton in a particular direction, and this separation is accomplished without damage to the cartons or rendering illegible the printing on the adjacent surfaces of the cartons, as often occurs when other adhesives are employed.

The adhesive of the invention can be blended in any desired proportions with starch, dextrine, and animal-glue solutions as well as with polyvinyl-alcohol solutions, hydroxy-ethyl-cellulose, methyl-cellulose and carboxy-methyl-cellulose solutions in which forms it has innumerable uses in he liquid-adhesive industry as a very economical raw material to reduce the cost of adhesives, inasmuch as the treated Lignone is cheaper than any other raw material presently used in this industry and is potentially available in very large quantities.

The treated Lignone of the invention may be blended with starches, dextrines and animal-glues for many uses in the adhesive industry. If the treated Lignone of the invention is blended with a small quantity of polyvinyl-alcohol, especially the medium viscosity, soluble grade polyvinyl-alcohol, the treated Lignone material of the invention is converted into an adhesive which feels and acts very much like animal-glue. The resultant blended product is very tenuous, has very good tack and adhesibe qualities and can be used for almost any purpose for which animal-glues are used in the industry where color is of secondary importance, and especially for the manufacture of gummed tape. If this treated Lignone is blended wtih a polyvinyl-alcohol solution of medium viscosity in the proportion of 1 to 6 parts of solid to 94–99 parts of solid (dry basis) Lignone and coated on kraft paper, the resulting tape is as good or better than the usual grade of gummed tape found on the market and which employs animal glue for the adhesive. The aforementioned ratio or proportion is based on the solid contents of the solutions of the polyvinyl-alcohol and the treated Lignone. Glycerine, glucose, invert sugar or any of the glycols (plasticizers) used in the gummed tape industry can be blended with this treated Lignone and polyvinyl-alcohol material in the usual proportions of 1–5% to improve the flexibility, viscosity and re-moistening qualities of this material. Varying the proportions of polyvinyl-alcohol to Lignone, the viscosity as well as the tenacity of the adhesive can be regulated to suit the purpose for which the adhesive or the tape is intended. More polyvinyl-alcohol will give a more viscous and more tenuous solution.

The process of the present invention involves adding a small quantity of phosphoric acid to the Lignone, agitating at room temperature, and heating the mixture with agitation to a temperature in the range of 175° F.–190° F. As the lots of Lignone purchased on the market are not uniform, the quantity of acid has to be determined by making a small laboratory cooking of the material with varying amounts of acid until the right quantity is found. It usually varies from 0.5 to 3.0%, the optimum results usually being obtained with about 1.2% phosphoric acid (75% H$_3$PO$_4$) on the liquid basis of the Lignone. This range of 0.5 to 3.0% of commercial phosphoric acid (75% H$_3$PO$_4$) is equivalent to a range of 0.375% to 2.25% of 100% H$_3$PO$_4$ on the liquid basis. Since the Lignone, as mentioned above, contains 50%–60% solids, it will be appreciated that the corresponding amount of phosphoric acid (75% H$_3$PO$_4$) varies in the range of approximately 1.0% to 6.0% on the dry or solid basis, with optimum results with about 2.4% on the dry basis, or 0.75% to 4.50% of 100% H$_3$PO$_4$ with optimum results with about 1.8% also on the dry basis. With most lots tested I have found that the best procedure is to add the required quantity of phosphoric acid to the cold Lignone in a container where it can be agitated and heated as well as cooled. After the cold solution has been agitated with the acid for 1 hour or 3 hours depending again on the individual lot of Lignone, it is heated to 175°–190° F., again depending on the lot of Lignone, stirred while heating and cooled while stirring to room-temperature when it is ready to be used. Some lots of Lignone may require longer agitation at room temperature when combined with the phosphoric acid than others, but in any event agitation for longer periods than necessary will not harm the resultant product.

The upper temperature limit in heating the mixture of Lignone and phosphoric acid is not critical, and as long as scorching or local overheating does not occur, the high temperatures do not prevent the desirable characteristics from being obtained in the resulting product. For this reason, the heating range of temperature may vary from 175° F. to 207° F., approximately.

The testing of the Lignone to determine the optimum quantity of phosphoric acid to be added may be done as follows: Six small beakers are each filled with 200 grams of Lignone. Varying percentages of the phosphoric acid are added to the different Lignone-filled beakers. Thus, the first beaker will have 0.5% phosphoric acid added to it; the 2nd beaker will have 1.0% phosphoric acid added to it, the 3rd beaker 1.5% phosphoric acid added to it, etc. This addition of the acid to the Lignone is done at room temperatures. The resulting contents of the beakers are then stirred or agitated with a glass rod every 5 minutes or so for a few seconds over a period of one hour. Then the beakers are all placed in a hot water bath and heated with stirring to a temperature of 185° F. When this temperature of 185° F. is reached, the beakers are all removed and placed in a cold water bath and cooled to room temperature while being agitated. Then tests are made on the contents of the different beakers to determine which particular beaker has the highest viscosity without becoming too pasty on standing. The percentage of phosphoric acid in this particular beaker is noted. Let it be assumed that it is 1.5%. Another group of beakers is then prepared with Lignone but with different percentages of phosphoric acid added ranging from, let us say, 1.0% to 1.6% in steps of 0.1% phosphoric acid. The same procedure is followed as mentioned above in the case where the individual beakers progressively differed from each other in acid content of 0.5%, namely, agitating at room temperature for 1 hour, heating to 185° F. while stirring, cooling and stirring, and then testing for the highest viscosity. In this way it is possible to find the optimum quantity of phosphoric acid needed to give the highest viscosity with the highest degree of tackiness for the particular lot of Lignone being tested.

Although it is preferred that the phosphoric acid be added cold (at room temperature) and the Lignone mixture agitated before heating, I have found that with a particular lot of Lignone, the acid could be added at room temperature and the Lignone heated without preliminary agitation at room temperature, or the phosphoric acid added at any temperature during the cooking of the Lignone, depending upon the particular lot of Lignone. If the Lignone is heated to 180°–185° F. and agitated while heating, and the phosphoric acid is added after this temperature is reached, and the resulting mixture is then heated to 190° F. with agitation, a good adhesive product may be obtained after cooling to room temperature with some lots of Lignone, and the characteristics of the resulting adhesive are: a shiny film when spread on paper, good tack and adhesion, but a viscosity much thinner than when the phosphoric acid is added cold and the mixture is agitated cold for a time before heating.

Although the exact constitutional formula for the Lignone composition is unknown and this composition varies from lot to lot, the action of phosphoric acid on this material is definite and distinctive and results in a novel adhesive product having highly advantageous characteristics. The contrast in outward appearance from the thin, greenish-dark brown untreated Lignone solution to the light brown, syrupy, highly tacky treated Lignone is also very noticeable. If a very light-brown adhesive product is desired, a quantity of 1% or less of zinc-hydrosulfite may be added to the phosphoric acid treatment.

What is claimed is:

1. An adhesive adapted for application in liquid form to sheet material and comprising a mixture whose major ingredient is the reaction product of the concentrated waste liquor of the sulfite pulp process and phosphoric acid equivalent to 0.5% to 3% phosphoric acid of 75% $H_3PO_4$ based on the liquid basis of the waste liquor, where the concentrated waste liquor of the sulfite pulp process and the phosphoric acid are the sole reactants, blended with a small quantity of polyvinyl alcohol.

2. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, stirring the mixture at room temperature, heating while stirring to a temperature in the range of approximately 175° F. to 207° F., where the concentrated waste liquor of the sulfite pulp process and the phosphoric acid are the sole reactants, and adding a polyvinyl alcohol solution to the acid treated waste liquor.

3. An adhesive comprising the reaction product of the concentrated waste liquor of the sulfite pulp process and phosphoric acid equivalent to 0.5% to 3% phosphoric acid of 75% $H_3PO_4$ based on the liquid basis of the liquor, where the concentrated waste liquor of the sulfite pulp process and the phosphoric acid are the sole reactants.

4. An adhesive comprising the reaction product of the concentrated waste liquor of the sulphite pulp process and phosphoric acid equivalent to approximately 1.2% of phosphoric acid of 75% $H_3PO_4$ based on the liquid basis of the liquor, where the concentrated waste liquor of the sulfite pulp process and the phosphoric acid are the sole reactants.

5. An adhesive comprising the reaction product of the concentrated waste liquor of the sulfite pulp process and phosphoric acid equivalent to 0.5% to 3% phosphoric acid of 75% $H_3PO_4$ based on the liquid basis of the liquor, where the concentrated waste liquor of the sulfite pulp process and the phosphoric acid are the sole reactants, blended with a solution of an adhesive.

6. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, stirring the mixture at room temperature, heating while stirring, where the concentrated waste liquor of the sulfite pulp process and the phosphoric acid are the sole reactants, and adding a solution of an adhesive to the acid treated waste liquor.

7. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, stirring the mixture at room temperature, heating while stirring, where the concentrated waste liquor of the sulfite pulp process and the phosphoric acid are the sole reactants, and adding a polyvinyl alcohol solution to the acid treated waste liquor.

8. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, stirring the mixture at room temperature, heating while stirring, where the concentrated waste liquor of the sulfite pulp process and the phosphoric acid are the sole reactants.

9. The process of making an adhesive which comprises ading to the concentrated waste liquor of the sulfite pulp process a quantity of phosphoric acid equivalent to 0.5% to 3% of phosphoric acid of 75% $H_3PO_4$ based on the liquid basis of the waste liquor, stirring the mixture at room temperature, heating while stirring to a temperature in the range of approximately 175° F. to 207° F., where the concentrated waste liquor of the sulfite pulp process and the phosphoric acid are the sole reactants.

JAMES E. FENN.

REFERENCES CITED

The following references are of record in the file of this patent:

UNITED STATES PATENTS

| Number | Name | Date |
|---|---|---|
| 1,977,728 | Leach | Oct. 23, 1934 |
| 2,116,227 | Winlof | May 3, 1938 |
| 2,148,893 | Bauer | Feb. 28, 1939 |
| 2,385,586 | Rudy et al. | Sept. 25, 1945 |
| 2,443,889 | Bruce | June 22, 1948 |

FOREIGN PATENTS

| Number | Country | Date |
|---|---|---|
| 527,894 | Great Britain | Oct. 17, 1940 |

OTHER REFERENCES

Lewis, article in Chem. and Engineering News, pages 1074–1080, June 25, 1945.

Delmonte, "The Technology of Adhesives," published by Reinhold Publ. Corp., N. Y., 1947, pages 252, 253, 255, and 256. (Copy in Div. 50.)